US012424069B2

(12) United States Patent
Wolf et al.

(10) Patent No.: US 12,424,069 B2
(45) Date of Patent: Sep. 23, 2025

(54) FIRE SENSING DEVICE

(71) Applicant: Honeywell International Inc., Charlotte, NC (US)

(72) Inventors: Benjamin H. Wolf, Leicester (GB); Daniel D. Ascough, Ilkeston (GB); Michael Barson, Nuneaton (GB); Christopher Dearden, Melton Mowbray (GB)

(73) Assignee: Honeywell International Inc., Charlotte, NC (US)

(*) Notice: Subject to any disclaimer, the term of this patent is extended or adjusted under 35 U.S.C. 154(b) by 180 days.

(21) Appl. No.: 18/203,802

(22) Filed: May 31, 2023

(65) Prior Publication Data

US 2024/0404383 A1 Dec. 5, 2024

(51) Int. Cl.
*G08B 17/107* (2006.01)
*G08B 29/04* (2006.01)

(52) U.S. Cl.
CPC ......... *G08B 17/107* (2013.01); *G08B 29/043* (2013.01)

(58) Field of Classification Search
CPC ............................ G08B 17/107; G08B 29/043
See application file for complete search history.

(56) References Cited

U.S. PATENT DOCUMENTS

| | | | | |
|---|---|---|---|---|
| 8,480,246 | B2 * | 7/2013 | Leard | G01N 21/255 250/362 |
| 9,666,049 | B2 | 5/2017 | Aebersold | |
| 9,767,665 | B2 | 9/2017 | Allemann et al. | |
| 9,863,636 | B2 | 1/2018 | Farley et al. | |
| 10,677,714 | B2 * | 6/2020 | Lincoln | G01N 21/53 |
| 11,127,284 | B1 | 9/2021 | Barson et al. | |
| 2012/0140231 | A1 * | 6/2012 | Knox | H10D 62/405 356/442 |
| 2015/0103346 | A1 * | 4/2015 | Erdtmann | G08B 17/107 356/338 |
| 2016/0335866 | A1 * | 11/2016 | Urrutia | G08B 17/10 |
| 2019/0180590 | A1 * | 6/2019 | Fischer | G08B 29/183 |
| 2020/0152034 | A1 * | 5/2020 | Duric | H10D 30/6215 |
| 2022/0058929 | A1 * | 2/2022 | Dearden | G01N 15/06 |
| 2022/0276163 | A1 | 9/2022 | Cheung et al. | |

FOREIGN PATENT DOCUMENTS

| | | | |
|---|---|---|---|
| CN | 111179540 | A | 5/2020 |
| CN | 114340085 | A | 4/2022 |

* cited by examiner

*Primary Examiner* — Mohamed Barakat
(74) *Attorney, Agent, or Firm* — Brooks, Cameron & Huebsch, PLLC

(57) ABSTRACT

A fire sensing device is described herein. One fire sensing device includes a first transmitter light-emitting diode (LED) configured to emit a first light, a second transmitter LED configured to emit a second light, a controller configured to command the first transmitter LED to cease emitting the first light and the second transmitter LED to start emitting the second light, and a photodiode configured to detect the first light and the second light.

19 Claims, 4 Drawing Sheets

FIRE SENSING DEVICE

TECHNICAL FIELD

The present disclosure relates generally to a fire sensing device.

BACKGROUND

Large facilities (e.g., buildings), such as commercial facilities, office buildings, hospitals, and the like, may have a fire alarm system that can be triggered during an emergency situation (e.g., a fire) to warn occupants to evacuate. For example, a fire alarm system may include a fire control panel and a plurality of fire sensing devices (e.g., smoke detectors), located throughout the facility (e.g., on different floors and/or in different rooms of the facility) that can sense a fire occurring in the facility and provide a notification of the fire to the occupants of the facility via alarms.

Over time components of a fire sensing device can degrade by becoming contaminated and/or falling out of their initial operational specifications. For example, a transmitter light-emitting diode (LED) used in an optical scatter chamber of a smoke detector can degrade with age and/or use. These degraded components can prevent the fire sensing device from detecting a fire at an early enough stage to provide facility occupants with sufficient time to evacuate. As such, codes of practice require sensitivity testing (e.g., alarm threshold verification testing) of smoke detectors at regular intervals to ensure they are operating properly. However, accurate sensitivity testing at the facility (e.g., on site) can be impractical due to difficulty in physically accessing the detectors and the need to deploy specialist equipment to carry out the testing. Consequently, some smoke detectors may be removed and taken to smoke tunnels to assess their performance while others may be tested onsite with rudimentary functionality tests.

In some countries, because an accurate sensitivity of the smoke detector may not be able to be determined and/or testing may not be able to be performed, devices are required to be replaced after a particular time period, even though the device may still be performing accurately. This can be costly, labor intensive, and creates unnecessary waste which can negatively impact the environment.

DETAILED DESCRIPTION

Figure 1A:
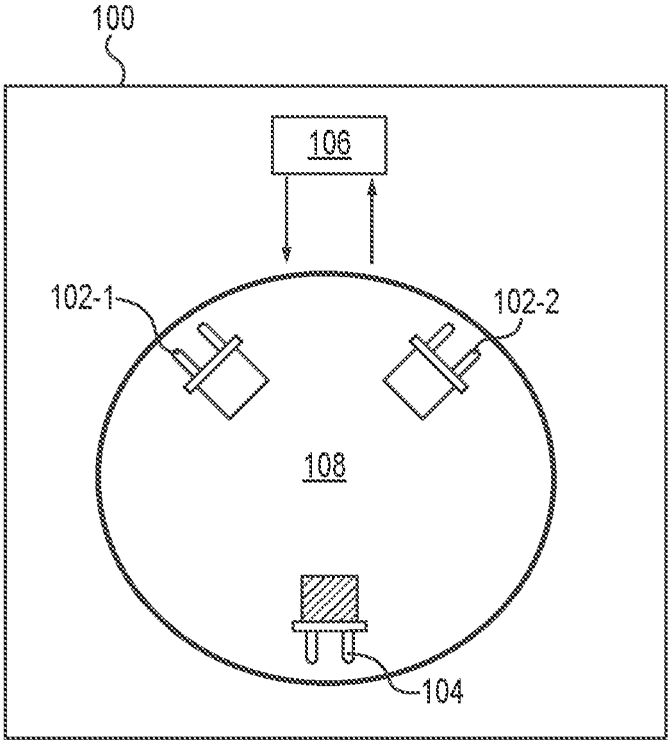
FIG. 1A illustrates an example of a fire sensing device in accordance with an embodiment of the present disclosure.

A fire sensing device is described herein. One fire sensing device includes a first transmitter LED configured to emit a first light, a second transmitter LED configured to emit a second light, a controller configured to command the first transmitter LED to cease emitting the first light and the second transmitter LED to start emitting the second light, and a photodiode configured to detect the first light and the second light.

Previous fire sensing devices (e.g., smoke detectors) may require a technician or maintenance engineer to remove the smoke detector from its base at the facility at which it is installed and bring the smoke detector to an expensive non-portable smoke tunnel to test and recalibrate the smoke detector to ensure the detector is functioning properly and extend the detector's life. In contrast, smoke detectors in accordance with the present disclosure can include a back-up transmitter LED to replace the primary transmitter LED when the primary transmitter LED becomes degraded and/or supplement for the primary transmitter LED, which can extend the degradation period of both the primary and back-up transmitter LEDs (e.g., the amount of time it takes for the LEDs to degrade) by reducing the duty cycle of each transmitter LED. Accordingly, fire sensing devices in accordance with the present disclosure may have extended service lives and can be replaced less often than previous smoke detectors, resulting in labor savings, cost savings, and/or less negative environmental impact.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 100 may reference element "00" in FIG. 1A, and a similar element may be referenced as 200 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1A illustrates an example of a fire sensing device 100 in accordance with an embodiment of the present disclosure. The fire sensing device 100 can be, but is not limited to, a fire and/or smoke detector of a fire alarm system. For instance, fire sensing device 100 can be a self-test detector. The fire sensing device 100 can include a controller 106 and an optical scatter chamber 108, as illustrated in FIG. 1A.

A fire sensing device 100 can sense a fire occurring in a facility and trigger a fire response to provide a notification of the fire to occupants of the facility. A fire response can include visual and/or audio alarms, for example. A fire response can also notify emergency services (e.g., fire departments, police departments, etc.) In some examples, a plurality of fire sensing devices can be located throughout a facility (e.g., on different floors and/or in different rooms of the facility).

In the example illustrated in FIG. 1A, the optical scatter chamber 108 includes a first transmitter light-emitting diode (LED) 102-1, a second transmitter LED 102-2, and a photodiode 104. The first transmitter LED 102-1 can emit a first light and the second transmitter LED 102-2 can emit a second light. The first light and the second light can have the same or different wavelengths. For example, the first transmitter LED 102-1 and/or the second transmitter LED 102-2 can be an infrared (IR) LED that emits light having a first wavelength and/or a blue LED that emits light having a second wavelength. In some embodiments, the first transmitter LED 102-1 and the second transmitter LED 102-2 can alternate emitting the first and second light, respectively.

Photodiode 104 can detect the first light emitted from the first transmitter LED 102-1 and/or the second light emitted from the second transmitter LED 102-2. The first transmitter LED 102-1 can emit the first light at a first duty cycle. Photodiode 104 can detect a scatter level and/or an LED emission level of the first light and/or the second light. The scatter level of the first light can be the first light reflected off of aerosol particles or the first light reflected off of walls of the optical scatter chamber 108 in a clean-air condition. The scatter level of the second light can be the second light reflected off of the aerosol particles or the second light reflected off of walls of the optical scatter chamber 108 in a clean-air condition. The scatter level and/or the LED emission level of the first light and/or the second light can be used (e.g., by controller 106) to detect smoke (e.g., determine whether smoke is present in the optical scatter chamber 108), sense a fire, and/or test whether the transmitter LEDs are degraded, as will be further described herein.

For example, the first transmitter LED 102-1 and the second transmitter LED 102-2, which may be referred to herein collectively as transmitter LEDs 102, can degrade (e.g., become contaminated and/or fall out of their initial operational specifications) over time leading to decreasing scatter levels and/or LED emission levels. To reduce labor intensive recalibrations and/or replacements of transmitter LEDs 102 over time, the fire sensing device 100 can include the second transmitter LED 102-2 to replace the first transmitter LED 102-1 when the first transmitter LED 102-1 becomes degraded and/or to supplement for the first transmitter LED 102-1 to extend the degradation period of both the first transmitter LED 102-1 and the second transmitter LED 102-2 (e.g., the amount of time it takes for the LEDs to degrade) by reducing the duty cycles of the first transmitter LED 102-1 and the second transmitter LED 102-2.

The controller 106 can replace and/or supplement the first transmitter LED 102-1 with the second transmitter LED 102-2 by commanding (e.g., issuing a command to) the first transmitter LED 102-1 to cease emitting the first light and the second transmitter LED 102-2 to start emitting the second light. For example, the controller 106 can determine the first transmitter LED 102-1 is degraded and command the first transmitter LED 102-1 to stop emitting the first light and the second transmitter LED 102-2 to start emitting the second light responsive to determining the first transmitter LED 102-1 is degraded. The determination that first transmitter LED 102-1 is degraded will be further described herein (e.g., in connection with FIG. 1C).

The controller 106 can reduce the duty cycle of the second transmitter LED 102-2 by commanding the second transmitter LED 102-2 to emit the second light at a lower pulse rate than the pulse rate at which the first light is emitted by the first transmitter LED 102-1. The lower pulse rate allows the second transmitter LED 102-2 to be monitored, but because the duty cycle is low, aging (e.g., sensitivity change) of the second transmitter LED 102-2 can be low or not measurable. The first transmitter LED 102-1 can be ran at a higher duty cycle for fast and/or more accurate fire detection. For example, a fire can be detected at an earlier stage when a higher duty cycle is used.

The second light may be emitted by the second transmitter LED 102-2 responsive to the controller 106 sensing a fire and/or detecting smoke based on the detected first light. The second transmitter LED 102-2 can be dormant or have a lower duty cycle than the first transmitter LED 102-1 prior to the second light being emitted responsive to sensing the fire and/or detecting smoke based on the detected first light. For example, the second transmitter LED 102-2 can emit a second light at a second duty cycle. The second duty cycle can be less than the first duty cycle prior to sensing the fire. The second duty cycle can be increased responsive to sensing the fire. The second transmitter LED 102-2 can increase the second duty cycle responsive to sensing the fire to confirm or deny the fire.

The fire response may be triggered by the controller 106 responsive to the detected second light. The controller 106 can sense the fire responsive to a detected scatter level of the first light being above a particular scatter level and the controller 106 can trigger the fire response responsive to a detected scatter level of the second light being above an additional particular scatter level, which can be the same or different from the particular scatter level.

Figure 1B:
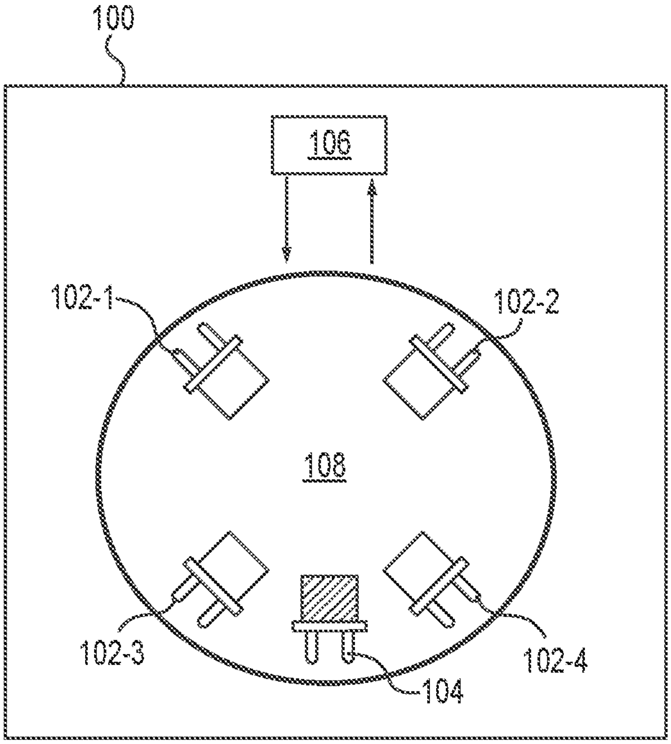
FIG. 1B illustrates an example of a fire sensing device in accordance with an embodiment of the present disclosure.

FIG. 1B illustrates an additional example of a fire sensing device 100 in accordance with an embodiment of the present disclosure. The fire sensing device 100 of FIG. 1B can include a controller 106 and an optical scatter chamber 108, as described in connection with FIG. 1A.

In the example illustrated in FIG. 1B, the optical scatter chamber 108 includes a first transmitter LED 102-1 that can emit a first light, a second transmitter LED 102-2 that can emit a second light, a third transmitter LED 102-3 that can emit a third light, a fourth transmitter LED 102-4 that can emit a fourth light, and a photodiode 104 that can detect the first, second, third, and/or fourth light (e.g., the scatter level and/or LED emission level of the light). The first light, second light, third light, and/or fourth light can have the same or different wavelengths. For example, the third transmitter LED 102-3 can emit the third light with a wavelength different from a wavelength of the first light and/or a wavelength of the second light.

As previously discussed in connection with FIG. 1A, fire sensing device 100 can automatically or upon command use one or more of the transmitter LEDs 102 along with the photodiode 104 to detect smoke within the fire sensing device 100. The fire sensing device 100 can include a number of transmitter LEDs 102 to replace a degraded transmitter LED and/or supplement one or more of the transmitter LEDs 102 to extend the degradation period of the one or more transmitter LEDs 102 by reducing the duty cycle of the transmitter LEDs 102. For example, the controller 106 can replace and/or supplement the third transmitter LED 102-3 with the fourth transmitter LED 102-4 by commanding the third transmitter LED 102-3 to cease emitting the third light and the fourth transmitter LED 102-4 to start emitting the fourth light (e.g., in response to determining the third transmitter LED 102-3 is degraded).

Figure 1C:
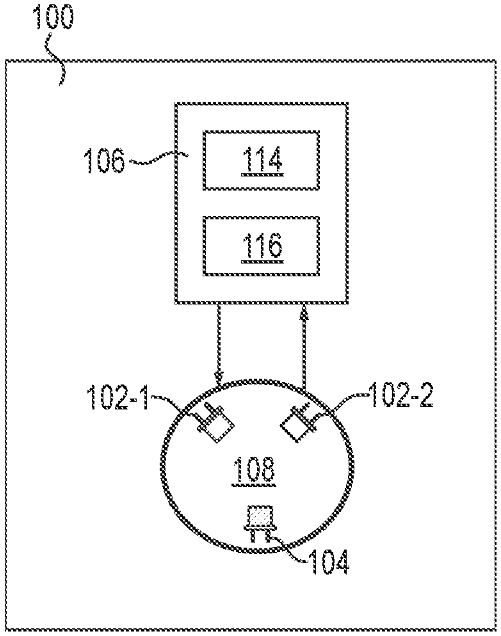
FIG. 1C illustrates an example of a fire sensing device in accordance with an embodiment of the present disclosure.

FIG. 1C illustrates an additional example of a fire sensing device 100 in accordance with an embodiment of the present disclosure. As shown in FIG. 1C, the fire sensing device 100 can include a controller 106 and an optical scatter chamber 108.

In the example illustrated in FIG. 1C the optical scatter chamber 108 includes a first transmitter LED 102-1, a second transmitter LED 102-2, and a photodiode 104, in a manner analogous to that described in connection with FIG. 1A. The first transmitter LED 102-1 can emit a first light, the second transmitter LED 102-2 can emit a second light, and the photodiode 104 can detect the first light from the first transmitter LED 102-1 and/or the second light from the second transmitter LED 102-2, in a manner analogous to that previously described in connection with FIG. 1A. In an additional example, the optical scatter chamber 108 can include third and fourth transmitter LEDs that can emit a third and fourth light, respectively, as previously described in connection with FIG. 1B.

Transmitter LEDs 102 can degrade over time leading to decreasing scatter levels and/or LED emission levels, as previously described herein. To reduce labor intensive recalibrations and/or replacements of transmitter LEDs 102 over time, the fire sensing device 100 can include the second transmitter LED 102-2 to replace the first transmitter LED 102-1 when the first transmitter LED 102-1 becomes degraded and/or to supplement for the first transmitter LED 102-1 to extend the degradation period of both the first transmitter LED 102-1 and the second transmitter LED 102-2 by reducing the duty cycles of the first transmitter LED 102-1 and the second transmitter LED 102-2.

The controller 106 can replace and/or supplement the first transmitter LED 102-1 with the second transmitter LED 102-2 by commanding the first transmitter LED 102-1 to cease emitting the first light and the second transmitter LED 102-2 to start emitting the second light. For example, the controller 106 can determine the first transmitter LED 102-1 is degraded and command the first transmitter LED 102-1 to stop emitting the first light and the second transmitter LED 102-2 to start emitting the second light responsive to determining the first transmitter LED 102-1 is degraded.

The controller 106 can perform a degradation test to determine whether a particular transmitter LED 102 is degraded. For instance, the controller 106 can include a memory 114 and a processor 116. Memory 114 can be any type of storage medium that can be accessed by processor 116 to perform various examples of the present disclosure. For example, memory 114 can be a non-transitory computer readable medium having computer readable instructions (e.g., computer program instructions) stored thereon that are executable by processor 116 to test, replace, and/or supplement a transmitter LED 102 in accordance with the present disclosure. For instance, processor 116 can execute the executable instructions stored in memory 114 to emit, by the first transmitter LED 102-1, a first light at a first duty cycle, detect, by the photodiode 104, a scatter level of the first light, sense a fire based on the scatter level of the first light, emit, by the second transmitter LED 102-2, a second light at a second duty cycle, wherein the second duty cycle is less than the first duty cycle prior to sensing the fire, and wherein the second transmitter LED 102-2 increases the second duty cycle responsive to sensing the fire, and detect, by the photodiode 104, a scatter level of the second light.

A previously discussed, the transmitter LEDs 102 can have varying LED emission levels due to, for example, degradation over time. In some embodiments, the controller 106 can compare the detected scatter level of the first light to a threshold scatter level or a previously detected scatter level of the first light. The controller 106 can determine the first transmitter LED 102-1 is degraded responsive to the detected scatter level of the first light being below the threshold scatter level and/or the previously detected scatter level of the first light. The controller 106 can similarly compare the detected scatter level of the second light to the threshold scatter level or a previously detected scatter level of the second light and determine the second transmitter LED 102-2 is degraded responsive to the detected scatter level of the second light being below the threshold scatter level and/or the previously detected scatter level of the second light. The threshold scatter level, the previously detected scatter level of the first light, and/or the previously detected scatter level of the second light can be stored in memory 114.

In some examples, the controller 106 can compare the LED emission level of the first light to a threshold LED emission level or a previously detected LED emission level of the first light. The controller 106 can determine the first transmitter LED 102-1 is degraded responsive to the detected LED emission level of the first light being below the threshold LED emission level and/or the previously detected LED emission level of the first light. The controller 106 can similarly compare the detected LED emission level of the second light to the threshold LED emission level or a previously detected LED emission level of the second light and determine the second transmitter LED 102-2 is degraded responsive to the detected LED emission level of the second light being below the threshold LED emission level and/or the previously detected LED emission level of the second light. The threshold LED emission level, the previously detected LED emission level of the first light, and/or the previously detected LED emission level of the second light can be stored in memory 114.

Figure 2:
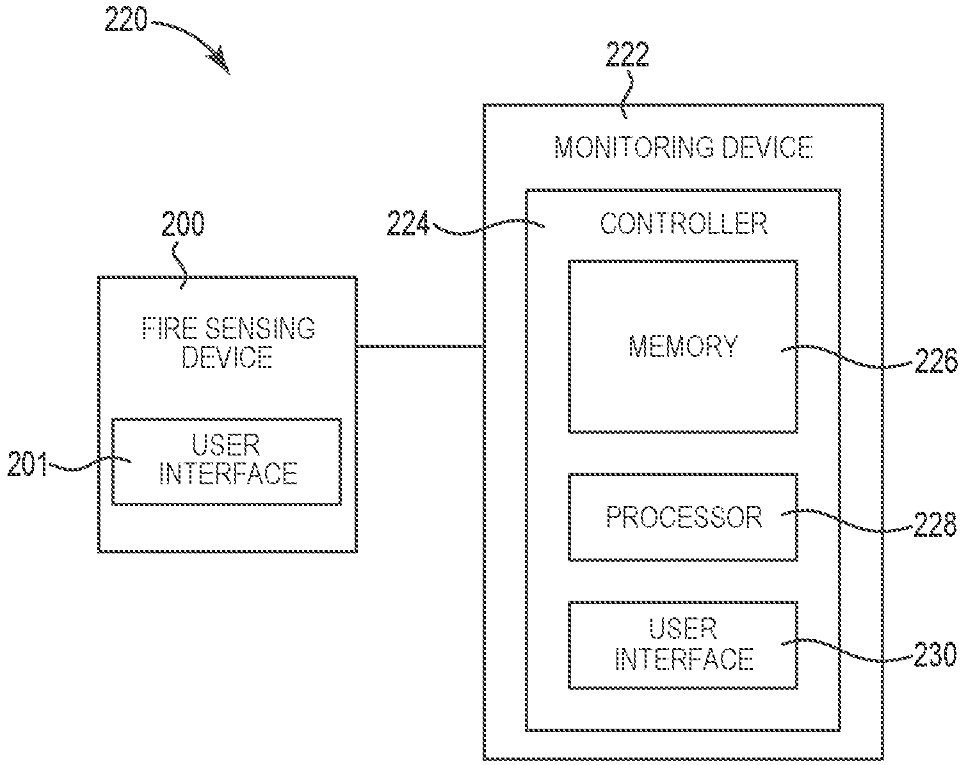
FIG. 2 illustrates a block diagram of a system including a fire sensing device and a monitoring device in accordance with an embodiment of the present disclosure.

FIG. 2 illustrates a block diagram of a fire alarm system 220 including a fire sensing device 200 and a monitoring device 222 in accordance with an embodiment of the present disclosure. Fire sensing device 200 can be, for example, fire sensing device 100 previously described in connection with FIGS. 1A, 1B, and 1C.

In some examples, the fire sensing device 100 can transmit (e.g., send) data and/or a message. In some embodiments, a detected scatter level, an LED emission level, a message that a degradation test was conducted, and/or a message that a transmitter LED (e.g., transmitter LED 102 in FIGS. 1A, 1B, and 1C) is or is not degraded can be transmitted. The fire sensing device 200 can send the data and/or a message to the monitoring device 222, for example (e.g., via a network, as will be further described herein). For example, a photodiode (e.g., photodiode 104 in FIGS. 1A, 1B, and 1C) of fire sensing device 200 can detect a scatter level of a first light and a scatter level of a second light and transmit the detected scatter level of the first light and the detected scatter level of the second light to the monitoring device 222.

As an additional example, the fire sensing device 200 can include a user interface 201 that can display data and/or a message. The user interface 201 can be and/or include a number of lights, a number of buttons, and/or a graphical user interface (GUI) that can provide and/or receive information to and/or from a user. For example, the user interface 201 can display and/or convey a message to extend the life of the fire sensing device 200, replace a transmitter LED, and/or replace the fire sensing device 200.

The monitoring device 222 can be a fire control panel, a fire detection control system, and/or a cloud computing device of the fire alarm system 220, for example. The monitoring device 222 can be configured to send commands to and/or receive data and/or messages from the fire sensing device 200 via a wired or wireless network, as will be further described herein. In some examples, the monitoring device 222 can receive messages and/or data from a number of fire sensing devices analogous to fire sensing device 200.

The monitoring device 222 can include a controller 224 including a memory 226, a processor 228, and a user interface 230. Memory 226 can be any type of storage medium that can be accessed by processor 228 to perform various examples of the present disclosure. For example, memory 226 can be a non-transitory computer readable medium having computer readable instructions stored thereon that are executable by processor 228 in accordance with the present disclosure.

For instance, processor 228 can execute the executable instructions stored in memory 226 to receive a detected scatter level of a first light and a detected scatter level of a second light, compare the detected scatter level of the first light to a threshold scatter level for the first light, and compare the detected scatter level of the second light to a threshold scatter level for the second light, transmit a command to the fire sensing device 200 for the first transmitter LED to cease emitting the first light responsive to the detected scatter level of the first light being below the threshold scatter level for the first light.

The instructions can further include transmitting a message and/or a command. The instructions can include transmitting a message to extend a life of the fire sensing device 200 responsive to the detected scatter level of the first light being equal to or above the threshold scatter level for the first light or the detected scatter level of the second light being equal to or above the threshold scatter level for the second light. The monitoring device 222 can transmit a message to replace the fire sensing device 200 responsive to the detected scatter level of the first light being below the threshold scatter level for the first light and the detected scatter level of the second light being below the threshold scatter level for the second light. In some example, the instructions can include transmitting a command to the fire sensing device 200 for the second transmitter LED to cease emitting the second light responsive to the detected scatter level of the second light being below the threshold scatter level of the second light. The threshold scatter level for the first light can be a previously detected scatter level of the first light or less than an average of a number of previously detected scatter levels of the first light. The threshold scatter level for the second light can be a previously detected scatter level of the second light or less than an average of a number of previously detected scatter levels of the second light. In some examples, memory 226 can store previously detected scatter levels of the first light and/or the second light and/or threshold scatter levels of the first light and/or the second light.

In some embodiments, the monitoring device 222 can transmit a message to extend the life of the fire sensing device 200 responsive to the detected scatter level of the first light being equal to or above the threshold scatter level for the first light or the detected scatter level of the second light being equal to or above the threshold scatter level for the second light. In some embodiments, the monitoring device 222 can transmit a message to replace the fire sensing device 200 responsive to the detected scatter level of the first light being below the threshold scatter level for the first light and the detected scatter level of the second light being below the threshold scatter level for the second light.

In some embodiments, processor 228 can receive a detected LED emission level of a first light and a detected LED emission level of a second light, compare the detected LED emission level of the first light to a threshold LED emission level for the first light, compare the detected LED emission level of the second light to a threshold LED emission level for the second light, transmit a command to the fire sensing device 200 for the first transmitter LED to cease emitting the first light responsive to the detected LED emission level of the first light being below the threshold LED emission level for the first light, and transmit a command to the fire sensing device 200 for the second transmitter LED to cease emitting the second light responsive to the detected LED emission level of the second light being below the threshold LED emission level of the second light. The threshold LED emission level for the first light can be a previously detected LED emission level of the first light and/or the threshold LED emission level for the second light can be a previously detected LED emission level of the second light. In some examples, memory 226 can store previously detected LED emission levels of the first light and/or the second light and/or threshold LED emission levels of the first light and/or the second light.

The monitoring device 222 can transmit a message to extend a life of the fire sensing device 200 responsive to the detected LED emission level of the first light being equal to or above the threshold LED emission level for the first light or the detected LED emission level of the second light being equal to or above the threshold LED emission level for the second light. In some embodiments, the monitoring device 222 can transmit a message to replace the fire sensing device responsive to the detected LED emission level of the first light being below the threshold LED emission level for the first light and the detected LED emission level of the second light being below the threshold LED emission level for the second light.

As shown in FIG. 2, the monitoring device 222 can include a user interface 230. The user interface 230 can be a GUI that can provide and/or receive information to and/or from a user and/or the fire sensing device 200. The user interface 230 can display messages and/or data received from the fire sensing device 200. For example, the user interface 230 can display a message to extend the life of the fire sensing device 200, replace a transmitter LED, and/or replace the fire sensing device 200. In some embodiments, the user interface 230 can receive a command from the user to swap transmitter LEDs and/or control pulse rates of one or more lights and the monitoring device 222 can transmit the command to the fire sensing device 200.

The networks described herein can be a network relationship through which the fire sensing device 200 and/or the monitoring device 222 communicate with each other. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, the network can include a number of servers that receive information from and transmit information to fire sensing device 200 and monitoring device 222, via a wired or wireless network.

As used herein, a "network" can provide a communication system that directly or indirectly links two or more computers and/or peripheral devices and allows a monitoring device 222 to access data and/or resources on a fire sensing device 200 and vice versa. A network can allow users to share resources on their own systems with other network users and to access information on centrally located systems or on systems that are located at remote locations.

For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get data. Applications may also communicate with network management software, which can interact with network hardware to transmit information between devices on the network.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A fire sensing device, comprising:
- a first transmitter light-emitting diode (LED) configured to emit a first light;
- a second transmitter LED configured to emit a second light;
- a controller configured to command the first transmitter LED to cease emitting the first light and the second transmitter LED to start emitting the second light; and
- a photodiode configured to:
  - detect a scatter level of the first light; and
  - detect a scatter level of the second light;
- wherein the controller is configured to:
  - transmit the detected scatter level of the first light and the detected scatter level of the second light to a monitoring device;
  - receive a command from the monitoring device; and
  - command the second transmitter LED to cease emitting the second light responsive to the command from the monitoring device.

2. The device of claim 1, further comprising a third transmitter LED configured to emit a third light with a wavelength different from a wavelength of the first light and a wavelength of the second light.

3. The device of claim 1, wherein the controller is configured to detect smoke responsive to the detected scatter level of the first light.

4. The device of claim 1, wherein the controller is configured to trigger a fire response responsive to the detected scatter level of the second light.

5. The device of claim 1, wherein the photodiode is configured to:
- detect an LED emission level of the first light; and
- detect an LED emission level of the second light.

6. A method for operating a fire sensing device, comprising:
- emitting, by a first transmitter light-emitting diode (LED) of the fire sensing device, a first light at a first duty cycle;
- detecting, by a photodiode of the fire sensing device, a scatter level of the first light;
- sensing a fire based on the scatter level of the first light;
- emitting, by a second transmitter LED of the fire sensing device, a second light at a second duty cycle, wherein the second duty cycle is less than the first duty cycle prior to sensing the fire, and wherein the second transmitter LED increases the second duty cycle responsive to sensing the fire;
- detecting, by the photodiode, a scatter level of the second light;
- transmitting the detected scatter level of the first light to a monitoring device;
- comparing, by the monitoring device, the detected scatter level of the first light to a threshold scatter level for the first light; and
- transmitting a command to the fire sensing device for the first transmitter LED to cease emitting the first light responsive to the detected scatter level of the first light being below the threshold scatter level for the first light.

7. The method of claim 6, wherein the second transmitter LED increases the second duty cycle responsive to sensing the fire to confirm or deny the fire.

8. The method of claim 6, wherein the scatter level of the first light is the first light reflected off of aerosol particles and the scatter level of the second light is the second light reflected off of the aerosol particles.

9. A fire alarm system, comprising:
- a fire sensing device, comprising:
  - a first transmitter light-emitting diode (LED) configured to emit a first light;
  - a second transmitter LED configured to emit a second light, wherein the first transmitter LED and the second transmitter LED alternate emitting the first light and the second light; and
  - a photodiode configured to:
    - detect a scatter level of the first light;
    - detect a scatter level of the second light; and
    - transmit the detected scatter level of the first light and the detected scatter level of the second light to the monitoring device; and
- a monitoring device configured to:
  - compare the detected scatter level of the first light to a threshold scatter level for the first light;
  - compare the detected scatter level of the second light to a threshold scatter level for the second light;
  - transmit a command to the fire sensing device for the first transmitter LED to cease emitting the first light responsive to the detected scatter level of the first light being below the threshold scatter level for the first light; and transmit a command to the fire sensing device for the second transmitter LED to cease emitting the second light responsive to the detected scatter level of the second light being below the threshold scatter level for the second light.

10. The system of claim 9, further comprising an optical scatter chamber comprising the first transmitter LED, the second transmitter LED, and the photodiode.

11. The system of claim 10, wherein the scatter level of the first light is the first light reflected off of walls of the optical scatter chamber in a clean-air condition and the scatter level of the second light is the second light reflected off of the walls of the optical scatter chamber in the clean-air condition.

12. The system of claim 9, wherein the first light is a first wavelength and the second light is a second wavelength.

13. The system of claim 12, wherein the first and second wavelengths are different.

14. The system of claim 9, wherein the monitoring device is a fire control panel, a fire detection control system, or a cloud computing device.

15. The system of claim 9, wherein the threshold scatter level for the first light is based on a previously detected scatter level of the first light and the threshold scatter level for the second light is based on a previously detected scatter level of the second light.

16. The system of claim 9, wherein the threshold scatter level for the first light is less than an average of a number of previously detected scatter levels of the first light and the threshold scatter level for the second light is less than an average of a number of previously detected scatter levels of the second light.

17. The system of claim 9, wherein the monitoring device is configured to:

transmit a message to extend a life of the fire sensing device responsive to the detected scatter level of the first light being equal to or above the threshold scatter level for the first light or the detected scatter level of the second light being equal to or above the threshold scatter level for the second light.

18. The system of claim 9, wherein the monitoring device is configured to:

transmit a message to replace the fire sensing device responsive to the detected scatter level of the first light being below the threshold scatter level for the first light and the detected scatter level of the second light being below the threshold scatter level for the second light.

19. The system of claim 9, wherein the monitoring device further comprises a user interface configured to display a message to replace the fire sensing device or extend a life of the fire sensing device.

* * * * *